(12) United States Patent
Jedlicka

(10) Patent No.: US 7,203,289 B2
(45) Date of Patent: Apr. 10, 2007

(54) METHOD AND SYSTEM FOR DETECTING AN ATYPICAL OCCURRENCE WITHIN A TELECOMMUNICATIONS NETWORK

(75) Inventor: Timothy E. Jedlicka, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 375 days.

(21) Appl. No.: 10/627,220

(22) Filed: Jul. 25, 2003

(65) Prior Publication Data

US 2005/0020269 A1    Jan. 27, 2005

(51) Int. Cl.
*H04M 15/00* (2006.01)

(52) U.S. Cl. .......................... 379/112.06; 379/112.01; 379/112.05; 379/133

(58) Field of Classification Search ................ 379/111, 379/112.01, 112.03, 112.04, 112.05, 112.06, 379/114.01, 133–134, 112.1, 137–140
See application file for complete search history.

(56) References Cited

U.S. PATENT DOCUMENTS

| | | | | |
|---|---|---|---|---|
| 5,825,769 | A | * | 10/1998 | O'Reilly et al. ............ 370/360 |
| 6,282,267 | B1 | * | 8/2001 | Nolting ................... 379/32.03 |
| 6,766,277 | B2 | * | 7/2004 | Siegel ........................ 702/187 |

\* cited by examiner

*Primary Examiner*—Quoc Tran

(57) ABSTRACT

A method for detecting an atypical occurrence, such as a public health crisis, within a given region in a telecommunications network. The method includes assigning a given weight to each of a plurality of destination addresses within the region according to a weighting system, collecting call data for the region for a given period of time, where the call data includes destination addresses and corresponding call occurrence times, developing a weighted call traffic pattern based upon the call data, and using the weighted call traffic pattern to detect an atypical occurrence within the region.

18 Claims, 3 Drawing Sheets

METHOD AND SYSTEM FOR DETECTING AN ATYPICAL OCCURRENCE WITHIN A TELECOMMUNICATIONS NETWORK

FIELD OF THE INVENTION

The present invention relates to the field of telecommunications in general, and more particularly, to a method and system for detecting an atypical occurrence, such as a public health crisis, within a given region in a telecommunications network.

BACKGROUND OF THE INVENTION

A public health crisis, such as a bioterrorist attack or an epidemic, would be difficult for health officials to identify in the early stages. For instance, biological agents can be secretly released by terrorists in a community and potentially kill hundreds of thousands in a relatively short period of time, but they are often extremely difficult to detect in the environment. A successful attack with biological agents, such as anthrax, smallpox, or bubonic plague, might only become clear days later, after many people in a community have become seriously ill and are beyond the help of available medical treatments. Further, many biological agents are highly contagious, so that if there is a time lapse before health officials recognize an attack, victims can multiply the harmful effects by spreading the disease to others.

Thus, early detection of a public health crisis will be critical to saving lives. The sooner a bioterrorist attack or epidemic is detected, the sooner an assessment of such an event can be completed, and the sooner medical care can be administered to those exposed. People today are incredibly mobile, commuting in an out of urban centers on a daily basis and traveling all over the world regularly. Failure to detect an outbreak of a contagious disease at the outset could result in its rapid spread. Therefore, there is a need in the art for an effective surveillance system to provide an early warning of unusual outbreaks of disease or other public health crises, whether natural or intentional.

SUMMARY OF THE INVENTION

In accordance with one aspect of the invention, a method for detecting an atypical occurrence, such as a public health crisis, within a given region in a telecommunications network is provided. The method includes assigning a given weight to each of a plurality of destination addresses within the region according to a weighting system, collecting call data for the region for a given period of time, where the call data includes destination addresses and corresponding call occurrence times, developing a weighted call traffic pattern based upon the call data, and using the weighted call traffic pattern to detect an atypical occurrence within the region.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, the preferred embodiments of which will be illustrated in the accompanying drawings wherein.

DETAILED DESCRIPTION OF THE INVENTION

It is understood that the specific devices and methods illustrated in the attached drawings and described in the following specification are simply exemplary embodiments of the inventive concepts defined in the appended claims. Therefore, specific examples and characteristics related to the embodiments disclosed herein are not to be considered as limiting, unless the claims expressly state otherwise.

Figure 1:
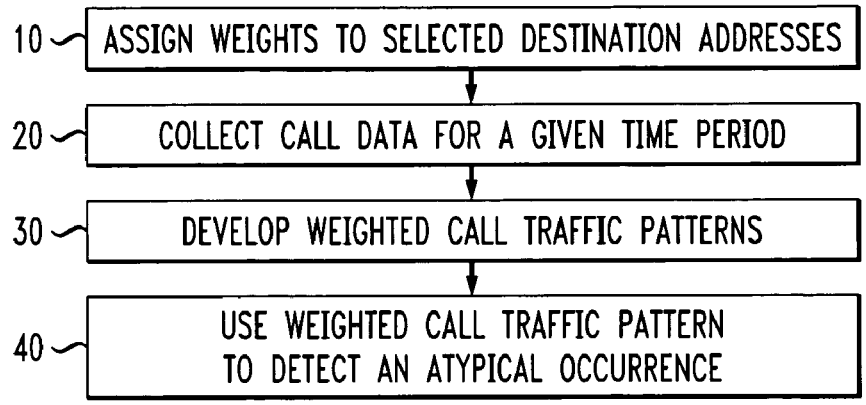
FIG. 1 is a flow chart illustrating an exemplary embodiment of the present invention.

FIG. 1 illustrates an exemplary embodiment of a method for detecting an atypical occurrence, such as public health crisis, within a community by using call data for that community. The detection method includes assigning a weight to each of a statistically significant number of destination addresses (e.g., telephone numbers) within a community according to a destination address weighting system (10). There are a number of weighting systems that may developed by the appropriate authorities, depending upon the nature of the occurrence that is to be detected. For example, if the occurrence that is to be detected relates to a public health crisis, the weighting systems may be developed by state and local public health authorities as well as the Centers for Disease Control and Prevention (CDC). The specific implementations of the weighting systems will be explained below.

For instance, as shown in Table 1 below, if a public health crisis is to be detected, certain telephone numbers may be given a numerical weight (1, 2, 3, . . . n), depending upon the nature of the business or enterprise associated with each number. As illustrated in Table 1, locations that may receive calls from families with one or more sick persons (e.g., medical facilities, pharmacies, schools, workplaces) may be given a greater weight than other locations (e.g., residences).

TABLE 1

| TYPE OF TELEPHONE NUMBER | WEIGHT |
| --- | --- |
| Medical (e.g., Hospitals, Doctors' Offices, Clinics) | 5 |
| Pharmacies | 4 |
| Schools | 3 |
| Offices (Workplaces) | 2 |

Next, specific call data for a given period of time is collected for the community (20). As will be explained in greater detail later through the use of some specific examples, there are numerous sources of call data for a community within a telecommunications network, including AMA billing data, SS7 message captures, provisioned data, and the like. A weighted call traffic pattern is then developed, based upon the call data that has been collected and the weighting system employed (30). Preferably, the weighted call traffic patterns are developed by any known means for processing information, such as a microprocessor-based personal computer or a server.

Thus, in our example, a healthy family might place one weighted call to a workplace in a typical day, yielding a value of weighted value of 2. However, a family with one sick person may make one call to the doctor, one to the school to report an absence, and perhaps one to the workplace to inform the spouse of the child's condition or to report late to work, yielding a total weighted value of 10. Accordingly, a healthy community of 100,000 families may have the weighted calling pattern depicted in Table 2.

TABLE 2

| Number of Sick Families (percentage) | Number of Healthy Families (percentage) | Weighted Calling Pattern Points (percentage) |
| --- | --- | --- |
| 5,000 (5%) | | 50,000 (20%) |
| | 95,000 (95%) | 190,000 (80%) |
| TOTAL | | 240,000 (100%) |

However, if the same community is undergoing a public health crisis, wherein the number of sick families has increased from 5,000 to 10,000 families, there may be a different weighted calling pattern as illustrated in Table 3.

TABLE 3

| Number of Sick Families (percentage) | Number of Healthy Families (percentage) | Weighted Calling Pattern Points (percentage) |
| --- | --- | --- |
| 10,000 (5%) | | 100,000 (36%) |
| | 90,000 (90%) | 180,000 (64%) |
| TOTAL | | 280,000 (100%) |

The next step is to use the weighted calling pattern to detect a public health crisis by comparing the weighted call pattern to a typical calling pattern for a given time period (40). Thus, by comparing Table 2 (calling pattern for healthy community) with Table 3 (calling pattern for sick community), it will be observed that when the number of sick families increases from five to ten percent, the weighted call traffic increases by sixteen percent in our example. This may be an indication of the occurrence a public health crisis, such as an epidemic or bioterrorist attack, and further action may need to be taken. The appropriate health authorities may be alerted to such information by any known means of communication, including by telephone or the Internet. Further, it may be possible for public health authorities to remotely monitor the weighted call patterns via computer. As explained in more detail below, there are various ways to implement the method for detecting an atypical occurrence within a telecommunications network.

Figure 2:
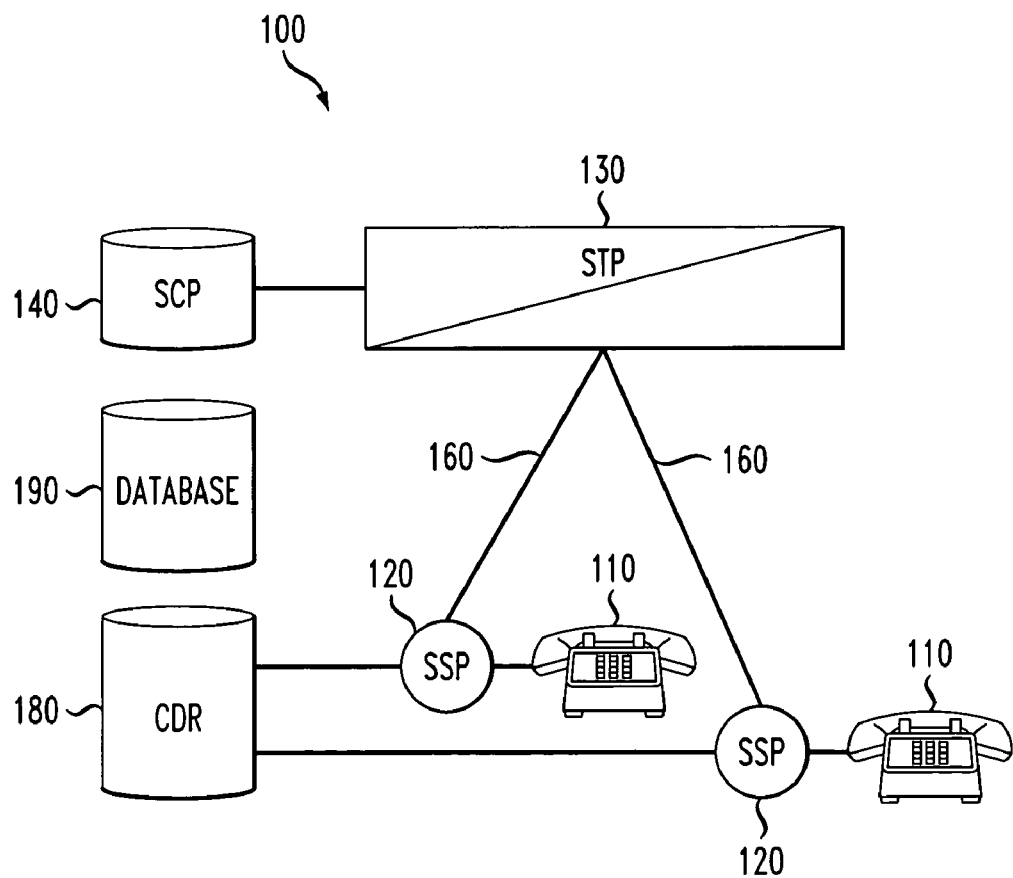
FIG. 2 is a block diagram illustrating an SS7 telecommunications network.

Since the examples presented below utilize call data for a community that may be obtained from one or more sources within a telecommunications network, it will be helpful to understand the basic structure of such a network. Turning now to FIG. 2, an SS7 telecommunications network 100 is shown. Common channel signaling system number 7 (or SS7) is a global standard for telecommunication, which is defined by the international Telecommunications Union (ITU). The standard defines the procedures and protocol by which network elements and the public switched telephone network (PSTN) exchange information over a digital signaling network for enabling wireless (cellular) and wireline call setup, routing, and control.

As shown in FIG. 2, the network 100 includes a plurality of communication devices such as telephones 110, and three types of signaling points—service switching points (SSP) 120, signal transfer points (STP) 130, and service control points (SCP) 140. The SSP 120 is a telephone switch that originates, terminates, or switches calls. The SSP 120 sends signaling messages to other SSPs 120 to set up, manage, and release circuits required to complete a call. The STP 130 is a packet switch that receives and routes signaling messages to the proper destination. The STP 130 routes each incoming message to an outgoing signaling link based upon routing information contained in the SS7 message. Thus, the STP 130 acts as a network hub. Finally, the SCP 140 is a centralized database that provides information for a call. Meanwhile, signaling is transmitted over signaling links 160.

Figure 3:
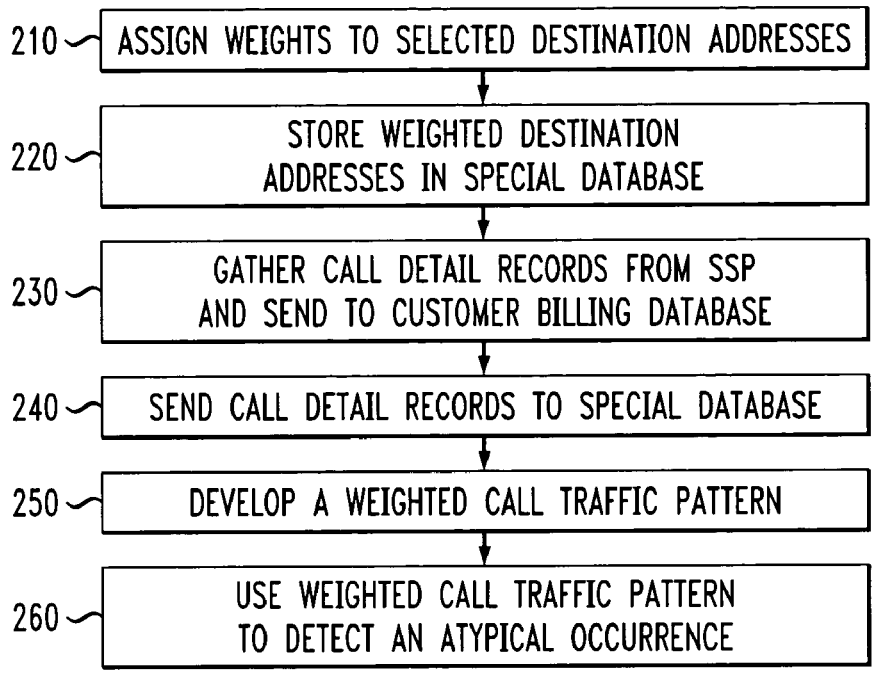
FIG. 3 is a block diagram illustrating an alternative embodiment of the present invention.

Referring now to FIG. 3, one way to implement the invention would be to use the existing automatic message accounting (AMA) billing systems to collect the call data in near real-time. Initially, appropriate weights are assigned to selected destination addresses according to a weighting system (210), and the information is stored in a special database 190 (220). After a call is made, call information is gathered from the SSP 120 and sent to a customer billing database 180 (230) by means of a computer program. This call information, which is known as a Call Detail Record (CDR), may include such information as a listing for each call record of a bill to phone number, an originating phone number, a terminating phone number, a call duration time, a call occurrence time, and various parameters. Typically, the CDR is stored in the customer billing database 180 until it can be rated. Of importance here is the terminating phone number, the call occurrence time, and optionally a new weighted call parameter.

Next, the CDRs are sent to the special database 190 (240) for further processing. Once the CDRs (i.e., the call data) are collected, a weighted call traffic pattern may be developed, through an executable computer program in the special database 190, by cross-checking the CDRs collected against the information contained in the special database 190 (250). Finally, the weighted calling pattern would be used to detect an atypical occurrence, such as a public health crisis (260).

Another way to implement the invention would be to add a Terminating Attempt Trigger (TAT) to each of the appropriate destination addresses at the SSP 120, which would send the call information to the SCP 140 as the data collection point. Advanced Intelligent Network (AIN)-based call forwarding is an example of a TAT, wherein the line is assigned a TAT and the SCP 140 is queried for the forward to number. Also, a call center could publish one number and when a call terminates to that number the SCP 140 is queried and the call routed to the "open" call center.

Figure 4:
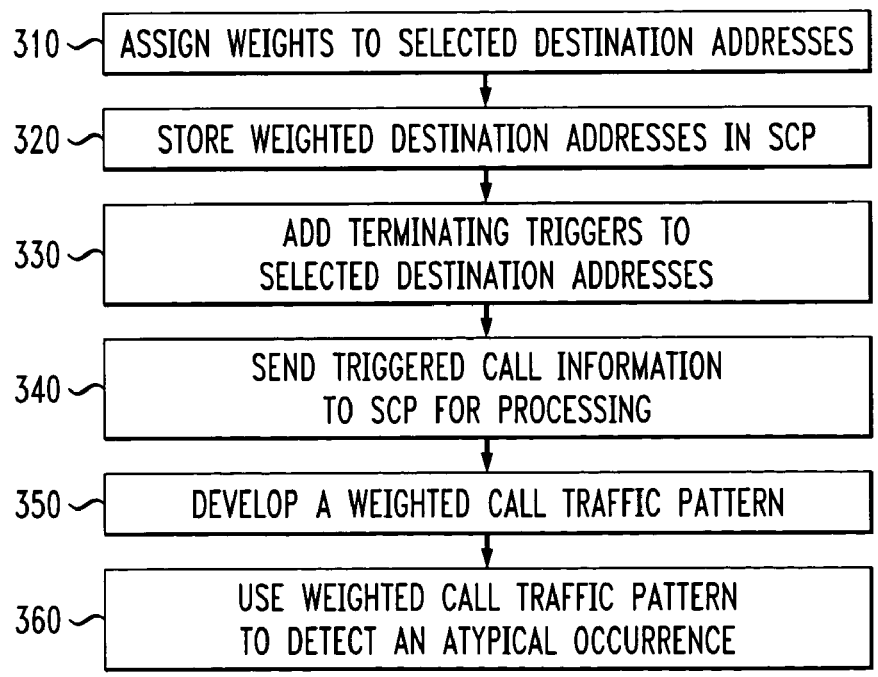
FIG. 4 is a block diagram illustrating an alternative embodiment of the present invention.

Thus, as shown in FIG. 4, appropriate weights are assigned to selected destination addresses according to a weighting system (310), and the information is stored in the SCP 140 (320). Next, terminating triggers are added to each of the appropriate telephone numbers at the SSP 120 (330). Then, when a destination number having a terminating trigger is called, call data, including the destination number and the call occurrence time, may be sent to the SCP 140 for processing (340). At that point, the destination number would be compared to the weighted destination addresses, and a weighted call pattern may be developed by means of a computer program in the SCP 140 (350). Finally, the weighted calling pattern may be used to detect a public health crisis (360).

Figure 5:
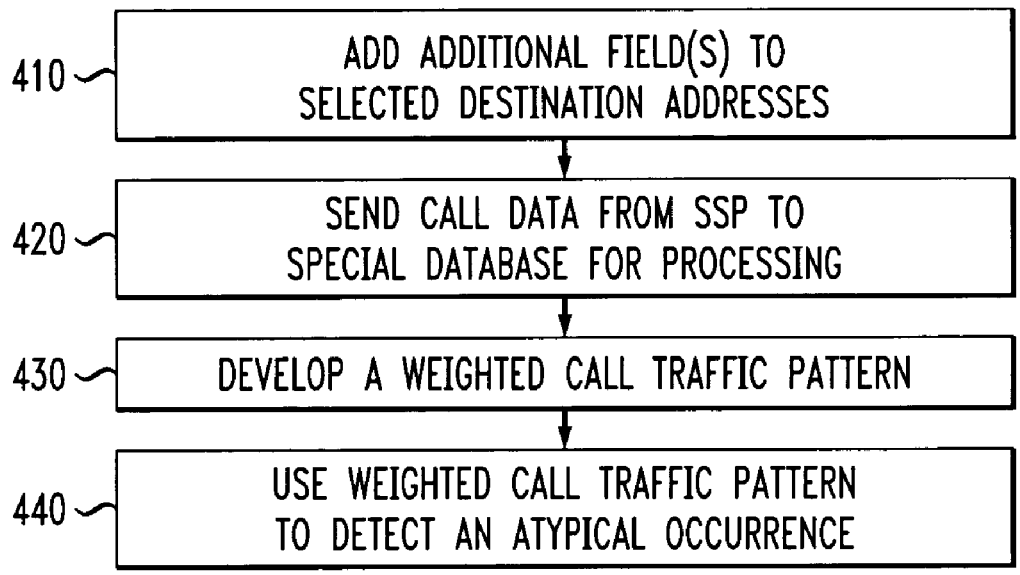
FIG. 5 is a block diagram illustrating an alternative embodiment of the present invention.

Yet another way to implement the invention would be to add a new feature on the SSPs 120 using existing or new provisioned data. It is known in the art that various types of information are associated with each telephone number, including Primary InterLata Carrier (PIC) (i.e. Long Distance service provider), Line Class Code (Type of service such as prison, hotel, hospital, etc.). This information is generally provisioned in different fields. Thus, as shown in FIG. 5, at least one additional field may be added to a telephone number, whereby the additional field(s) would include the appropriate weight to be given to that number (410). Next, the call data is obtained from the SSP 120 and sent to the special database 190 (420). Such call data would already contain the destination number and its associated weight. Accordingly, through a computer program in the special database, a weighted call traffic pattern may be developed (430). Finally, the weighted calling pattern would be used to detect a public health crisis (440).

Yet another way to implement the invention would be to capture the SS7 initial address message (IAM) from the STP 130. Referring once again to FIG. 2, within an SS7 network, an IAM is sent by each SSP 120 needed to complete the circuit between the calling party and called party until the circuit connects to the destination SSP 120. Thus, when a call is placed to a phone number, the originating SSP 120 transmits an IAM to reserve an idle trunk circuit from the originating SSP 120 to the destination SSP 120. An IAM may include various pieces of information, including the originating point code, destination point code, circuit identification code, dialed digits, and the calling party number. Generally, the destination SSP 120 examines the dialed number, determines that it serves the called party, and that the line is available for ringing. The destination SSP 120 transmits an address complete message (ACM) to the originating SSP 120 to complete the circuit from the calling party to the called party.

Figure 6:
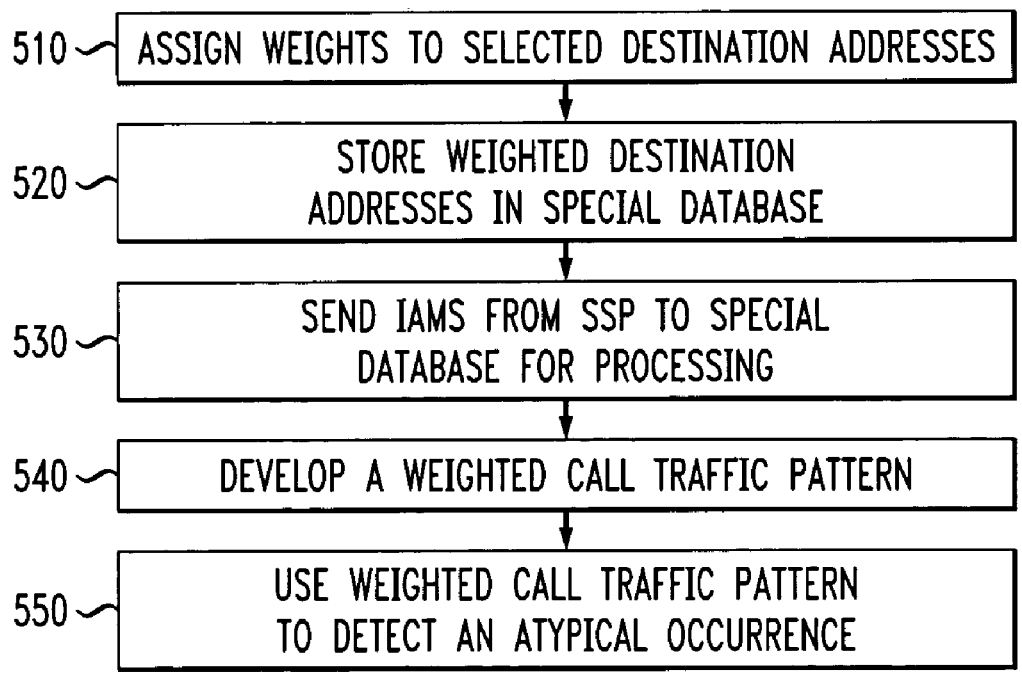
FIG. 6 is a block diagram illustrating an alternative embodiment of the present invention.

Thus, as illustrated in FIG. 6, appropriate weights are assigned to selected destination addresses according to a weighting system (510) and stored in the special database 190 (520). Next, the IAMs are sent to the special database 190 (530). There, through a computer program, the destination numbers may be isolated and compared to the weighted destination numbers to develop a weighted call traffic pattern (540). Finally, the weighted calling pattern would be used to detect a public health crisis (550).

The invention has been described as a reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method for detecting an atypical occurrence within a given region in a telecommunications network, comprising:
   assigning a given weight to each of a plurality of destination addresses within said region according to said weighting system;
   collecting call data for said region for a given period of time, said call data including calls made to said destination addresses and corresponding call occurrence times;
   developing a weighted call traffic pattern based upon said call data; and,
   using said weighted call traffic pattern to detect an atypical occurrence within said region.

2. The method defined in claim 1 wherein said region comprises a community and said atypical occurrence is a public health crisis, said public health crisis comprising a bioterrorist attacks or a health epidemics.

3. The method defined in claim 2 wherein said destination addresses comprise telephone numbers.

4. The method defined in claim 3 wherein said weighting system includes giving more weight to telephone numbers associated with medical-related locations, pharmacies, schools and workplaces than to other telephone numbers.

5. The method defined in claim 1 wherein said call data comprises call detail records.

6. The method defined in claim 5 further comprising sending the weighted destination addresses to a special database.

7. The method defined in claim 6 further comprising adding a terminating trigger to selected destination addresses.

8. The method defined in claim 1 further comprising adding an additional field to each of said plurality of destination addresses, said field corresponding to said weight of said destination address.

9. The method defined in claim 1 wherein said call data comprises initial address messages.

10. A system for detecting an atypical occurrence within a given region in a telecommunications network, comprising:
    means for assigning a given weight to each of a plurality of destination addresses within said region according to said weighting system;
    means for collecting call data for said region for a given period of time, said call data including calls made to said destination addresses and corresponding call occurrence times;
    means for developing a weighted call traffic pattern based upon said call data; and,
    means for using said weighted call traffic pattern to detect an atypical occurrence within said region.

11. The system defined in claim 10 wherein said region comprises a community and said atypical occurrence is a public health crisis, said public health crisis comprising a bioterrorist attacks or a health epidemics.

12. The system defined in claim 11 wherein said destination addresses comprise telephone numbers.

13. The system defined in claim 12 wherein said weighting system includes giving more weight to telephone numbers associated with medical-related locations, pharmacies, schools and workplaces than to other telephone numbers.

14. The system defined in claim 13 wherein said call data comprises call detail records.

15. The system defined in claim 14 further comprising means for sending the weighted destination addresses to a special database.

16. The system defined in claim 15 further comprising means for adding a terminating trigger to selected destination addresses.

17. The system defined in claim 10 further comprising means for adding an additional field to each of said plurality of destination addresses, said field corresponding to said weight of said destination address.

18. The system defined in claim 10 wherein said call data comprises initial address messages.

* * * * *